United States Patent Office 2,762,749
Patented Sept. 11, 1956

2,762,749

PRODUCTION OF LACTASE

Robert Page Myers, Mariemont, Ohio, and Edwin G. Stimpson, Sayville, N. Y., assignors to National Dairy Research Laboratories, Inc., Oakdale, N. Y., a corporation of Delaware No Drawing. Application May 2, 1951,
Serial No. 224,252

14 Claims. (Cl. 195—67)

This invention relates to the production of lactase enzyme and, more particularly, to a process of preparing a lactase-active zymase-inactive yeast product of bland flavor and good stability, and to the product obtainable by this process.

The utilization of milk products in concentrated form has been limited heretofore by the low solubility of lactose in water. For example, skim milk cannot be stored if it is concentrated beyond a total solids content of 30%, for at higher concentrations large lactose crystals quickly are deposited. Similarly, there is an upper limit of solids concentration for both whole milk and whey beyond which lactose crystallization becomes a problem. Also, in the manufacture of ice cream the amount of milk solids-not-fat must be within the range from 10 to 10.5%, for at higher proportions lactose will crystallize on storage and produce a so-called "sandy" ice cream.

Crystallization of lactose is a serious problem, because it upsets the uniformity of the product and makes the product difficult to handle and use. The problem is further complicated by the difficulty experienced in redissolving lactose once it has crystallized.

For this reason, it has been proposed that the lactose present in milk be hydrolyzed to simple sugars more soluble in water than lactose through use of lactase enzyme. In such a process the lactase enzyme preparation is added to the milk, which is then incubated at an elevated temperature until the desired amount of hydrolysis has taken place.

Accordingly, it is an object of the invention to provide an improved method of preparing a lactase enzyme preparation which can be employed to hydrolyze the lactose present in milk and produce a nearly or substantially lactose-free milk product of good flavor.

It is a further object of the invention to prepare a lactase-active zymase-inactive yeast product of bland flavor and good stability.

These objects are accomplished in accordance with the invention by propagating yeast of a lactase-producing strain under growth-favoring conditions in a nutrient medium free from heat-coagulable protein in which lactose is the chief source of carbohydrate and then treating the yeast to inactivate the zymase.

Among the yeast strains which may be propagated by the process of the invention are *Saccharomyces fragilis*, *Torulopsis spherica*, *Zygosaccharomyces lactis*, and strains of *Torula utilis* and *Candida pseudotropicalis* adapted to the utilization of lactose for growth and fermentation.

The ingredients and proportions thereof essential to any nutrient medium employed for the propagation of yeast, and particularly yeasts of the above strains, are well known to those skilled in the art and details thereof need not be given here. It is important, however, that nutrient media employed in accordance with the present invention contain lactose as the chief source of carbohydrate in an amount within the range from 0.5 to 5%. The total solids content of the nutrient medium should be between about 2 and about 8%, preferably 3%, and its pH should be approximately 4.5, but a satisfactory enzyme preparation can be obtained employing a nutrient medium whose pH lies within the range of 3.5 to 7.5.

The nutrient medium may be prepared synthetically by dissolving in water 0.5 to 5% lactose, 0.4% of some source of inorganic nitrogen, such as urea, ammonia, or diammonium phosphate, 1% peptone, 0.5% yeast extract, and other yeast nutrient materials. Usually it is more convenient, however, and less expensive, to employ as a base for the medium a natural product which contains all or a large proportion of the materials required for yeast growth, and to supply nutrients in which the material may be deficient. Well known materials in plentiful supply which contain all yeast nutrient requirements except inorganic nitrogen are whey derived from cheese or casein manufacture, and the mother liquor wash water obtained as a waste product in the production of lactose from whey or milk products.

Heretofore, whey used as the base for a nutrient medium for the propagation of the lactase-producing yeasts has been in its natural protein-containing state. The protein was thought to provide some of the nutrient necessary for the growth of the yeast. In accordance with the invention, it has been determined that that protein which is coagulable at elevated temperatures is neither essential nor desirable. In the absence of this protein, isolation of a lactase-containing product of high activity and good flavor is facilitated. The term "deproteinated whey" is used in the specification and claims to refer both to wheys, such as casein whey and cheese whey, and to whey derivatives, such as mother liquor wash water, which are substantially free from heat-coagulable protein.

In Table I there is given the typical composition of some whey and whey derivatives useful as a base for the yeast nutrient medium:

TABLE I

| | Cheddar Cheese Whey, Percent | Cream Cheese Whey, Percent | Casein Whey, Percent | Mother Liquor Wash Water, Percent |
|---|---|---|---|---|
| Total Solids | 3.0 | 3.0 | 3.0 | 3.0 |
| Lactate Ion | 0.11 | 0.26 | | |
| Acidity as lactic | 0.10 | 0.24 | 0.01 | 0.11 |
| Fat | 0.13 | 0.062 | | |
| Total Nitrogen | 0.055 | 0.04 | 0.022 | 0.04 |
| Lactose . H₂O | 2.23 | 2.11 | 2.74 | 1.5 |
| Amino Nitrogen | 0.013 | 0.02 | 0.01 | 0.019 |
| Ammonia | 0.013 | 0.026 | 0.002 | |
| Urea | 0.0095 | 0.0056 | | |
| Calcium | 0.0215 | 0.0377 | | |
| Sodium | 0.0215 | 0.0175 | | |
| Potassium | 0.071 | 0.058 | | |
| Magnesium | 0.004 | 0.004 | | 0.25 |
| Phosphate | 0.100 | 0.100 | | |
| Ash | 0.24 | 0.243 | 0.38 | 0.86 |

It has also been determined that it is important that the nutrient medium be pasteurized before yeast is added thereto. Pasteurization may be brought about by heating the medium at 140 to 160° F. for 30 minutes or longer, or 165° F. for ½ hour, or at 180 to 185° F. or higher for 10 to 30 seconds.

Consequently, when whey is employed as the yeast nutrient medium in the process of the invention, it is first freed from heat-coagulable protein by adjusting its pH to within the range from 4.5 to about 7.0 and then heating at a temperature in the range from 185° F. to about 220° F. until coagulation of protein is complete. Depending upon the initial pH, the pH may be adjusted by addition of lime or other suitable base or an acid such as lactic acid, or a mineral acid, such as hydrochloric or sulphuric acid, or by inoculation with lactic acid-producing bacteria. By the time coagulation of the protein is complete, which requires approximately 30 minutes, the whey has also been pasteurized.

Thereafter, while the whey is kept at an elevated pasteurization temperature, it is fortified with such additional yeast nutrient materials as may be required. It is desirable to add these materials at a pasteurization temperature in order to destroy bacteria contained therein. Some source of inorganic nitrogen should be added, say 0.2% urea, 0.14% ammonia, or 0.4% diammonium phosphate. Also, if desired, 0.1% cornsteep may be added. The solids content of the whey is then adjusted to within the range from 2 to 8%. Dependent upon the initial solids content, this may be accomplished either in the course of fortifying with additional solid nutrient material or by dilution with water or a solution of the added nutrient material.

Before addition of yeast, the nutrient medium is brought to a propagation temperature within the range of 80 to 100° F. An actively growing starter culture of the yeast in the nutritive medium then is added in an amount of 10% on the basis of the main batch of medium. This inoculation should give a main fermentation batch containing a cell count of 10 to 60 million yeast cells per ml. During fermentation the nutrient medium is held at a temperature within this range; a temperature of 86° F. is the optimum.

If no aeration is employed, 30 hours or more may be required for the fermentation. Therefore, in order to shorten the fermentation time it is desirable to aerate the nutrient medium. Aeration at a rate of 0.009 volume of air per volume of nutrient medium per minute will reduce the fermentation time to from 18 to 24 hours, while a higher aeration rate, of the order of 0.5 volume of air per volume of nutrient medium per minute, will further reduce the fermentation time to from 10 to 12 hours. In general, the higher the rate of aeration, within the range of aeration rates specified, the higher the yield of yeast. While an aeration rate within the range of 0.009 to 0.5 volume of air per volume of nutrient medium per minute is preferred, it will be understood that higher aeration rates may be employed to meet special requirements.

If, in addition to aeration, the nutrient medium is agitated vigorously, it is possible to further reduce the fermentation time to from 2 to 8 hours.

With a combination of aeration and agitation, it is possible to establish a continuous fermentation process in which the yield of yeast in a unit time is at least 10 times that of a batch process under similar growth-favoring conditions. In this process, nutrient medium is fed in at a constant rate to replenish exhausted nutrients, while fermented nutrient medium is withdrawn at a similar constant rate for the harvesting of yeast therefrom. Such a continuous process is particularly desirable from a commercial point of view.

The nutrient medium is the same as is used in a batch process, and preferably is derived from whey. In practice, the nutrient medium is inoculated with wet yeast cake in an amount equal to one to two billion yeast cells per cc. (0.7 to 1.4%, by weight of the medium based on the dry weight of the yeast added), and these cells are encouraged to grow at a maximum rate under optimum growth-favoring conditions of aeration (0.1 to 1 volume of air per volume of nutrient medium per minute), agitation (sufficient to give a dispersion of small air bubbles throughout the liquid), and temperature (80° to 100° F.) using proper rates of feeding in of nutrient medium and withdrawing of fermented liquors.

A yeast concentration of one to two billion cells per cc. represents approximately the maximum concentration which can be maintained without overcrowding. Therefore it is desirable in a continuous process to maintain the concentration within this range by removing fermentation liquor continuously at the same rate at which fresh nutrient medium is added.

Yeast may be harvested from this withdrawn liquor continuously or from time to time, as desired. Spent liquors may be fortified with nutrients, and reused.

At 86° F., with proper agitation and aeration at a rate of 0.2 volume of air per volume of medium per minute, using a whey-base nutrient medium of 3% total solids, fortified with 0.4% diammonium phosphate, an initial inoculation of one billion actively growing *S. fragilis* yeast cells per cc. of medium, a continuous fermentation will double itself to form 2 billion yeast cells per cc. every 4 hours, whereas a batch fermentation under the same conditions would produce only 0.15% of yeast cells or a maximum of 200 million yeast cells per ml. in the same time and not over 800 million yeast cells per ml. in 18 hours.

In either the batch or continuous processes, if a product of superior taste properties is desired, it is advisable to wash the yeast in water after it has been harvested. For most uses, however, as in the hydrolysis of lactose for the preparation of an animal feed or as a nutrient in antibiotic media, washing is not essential.

The harvested yeast contains a high proportion of lactase and zymase and can be used without further treatment to ferment lactose to carbon dioxide and alcohol. Usually, however, it is desirable for ease of handling to filter and compress the yeast into cakes or to dry it. Drying must be done under such conditions that the lactase enzyme activity is not destroyed.

If the lactase enzyme preparation is intended to be used in the hydrolysis of lactose to glucose and galactose without converting glucose and galactose to carbon dioxide and alcohol, it is essential that lactase be uncontaminated with those yeast enzyme systems which convert glucose and galactose to carbon dioxide and alcohol. These enzyme systems are collectively called "zymase" by the art, and it will be understood that yeast lactase preparations of the invention must be zymase-inactive if conversion of glucose and galactose to carbon dioxide and alcohol is to be prevented. If the zymase content in the yeast is inactive, it is not necessary to separate the lactase from the yeast before adding the preparation to the milk product.

The zymase may be destroyed without destroying the lactase by drying the yeast under carefully controlled conditions or by plasmolyzing the yeast with an organic solvent, such as toluene, chloroform or ethyl ether, or by heating the yeast at 125° F. in a medium whose pH is about 7. In the preparation of a commercial lactase-active zymase-inactive enzyme preparation in marketable form it is desirable to dry the yeast, and this method of inactivation is therefore preferred.

Freeze-drying of the yeast in vacuo at a temperature of from 0 to 30° F. is capable of producing a light colored easily dissolved product of constant high potency and good flavor. This product can be used to hydrolyze the lactose in a milk product, and produces a hydrolyzed material which is substantially free from any objectionable taste.

Spray-drying under carefully controlled conditions produces a product of only slightly less potency than the freeze-dried product. The spray-dried product likewise has a good flavor and a good color, and does not impart an adverse flavor to a milk product.

It is recommended when spray-drying is used that the yeast be dispersed in water to form a cream or slurry of from 10 to 18% yeast solids. This slurry is fed into a spray drier whose inlet air stream is from 200 to 310° F. and whose outlet air stream is from 130 to 205° F. At temperatures above this range there occurs a 40 to 65% loss of enzyme activity, while at temperatures below this range it is not possible to obtain a dry enough product. An inlet air temperature of 250° F. and an outlet air temperature of about 170° F. are optimum conditions for most spray driers. The dry yeast powder should be cooled to room temperature as quickly as possible after leaving the spray drier and should then be stored at 40° F.

A product not fully satisfactory, from a taste standpoint, for human consumption but adequate for the preparation of animal feeds in antibiotic media can be prepared by drying the yeast in a tray drier at a temperature not in excess of 150° F. If the drying is carried out at atmospheric pressure, the drying time should not be more than 4 hours, but if a vacuum is employed a drying time of as long as 6 hours is tolerable. The tray-dried product is darker in color than the freeze- or spray-dried product.

Drying on a roll drier completely inactivates the lactase enzyme.

The lactase preparation in accordance with the invention is white, grey or tan in color, depending upon the drying process employed, and preferably will be in powder form or in the form of small friable lumps. The preparation disperses readily in three times its volume of water. It has the following analysis:

| | Percent |
|---|---|
| Moisture | 4 to 10 |
| Protein (N×6.38) | 40 to 55 |
| Ash | 7 to 10 |
| Fiber | 3 to 10 |

The lactase activity (and zymase inactivity) of the lactase preparations of the invention is determined by the following test, hereinafter called the Lactase Activity Test: The preparation, when mixed with 30% total solids, pasteurized, nonfat milk concentrate in a proportion of 1 part of preparation to each 40 parts of lactose, shall give 85% conversion of the lactose therein to simple sugars in 4 hours' time at 123° F.

Lactase preparations in accordance with the invention can be prepared as set forth in the following examples:

*Example 1*

Whey derived from the production of casein or cheddar cheese or cream cheese is adjusted to a pH of 4.5, either by addition of lactic acid or by treatment with lactic acid-producing bacteria. The whey is then heated at 185° F. for 30 minutes in order to coagulate the protein, and the coagulate protein is separated by decantation or filtration.

While the clarified whey is still at 185° F., 0.4% diammonium phosphate is added, and the pH of the whey is again brought to 4.5. The solids content is now adjusted to 2 to 8%. After cooling the whey to 86° F., from 0.2 to 0.4% of the whey of S. fragilis wet yeast cells are added, and the mass is allowed to ferment for about 20 hours at approximately 86° F., with aeration with from 0.009 to 0.5 volume of air per volume of medium per minute.

The yeast cells are separated from the fermentation liquor and washed with warm water.

The yeast is then dispersed in water to form a yeast cream of from 10 to 18% solids content. The yeast cream is fed into a spray drier whose inlet air stream is at a temperature of about 250° F. and whose outlet air stream is at approximately 170° F. The dry yeast powder is cooled to room temperature as quickly as possible after leaving the spray drier and is stored at 40° F. until use.

The lactase enzyme preparation obtainable by the above process has good stability, and passes the Lactase Activity Test. It has a good light color and a bland flavor, and does not impart an undesirable flavor to milk products in which it is incorporated.

The following example illustrates utilization of this product to hydrolyze the lactose contained in a milk product:

*Example 2*

Raw whole milk, suitable for human use, is separated, and the resulting skim milk pasteurized at 160° F. for 30 minutes, then condensed in vacuo at a low temperature to a 30% solids content. The temperature of the condensed skim milk is adjusted to 123° F. Yeast lactase, prepared as set forth in Example 1, is dispersed in four times its weight of water to form a slurry, and this slurry is added to the skim milk in a ratio of one part by weight yeast lactase to each fifty parts by weight of lactose in the skim milk. During addition of the lactase slurry the skim milk is agitated vigorously. The mixture is then held at 123° F. for four hours, at the end of which time 80 to 90% of the lactose has been converted to glucose and galactose. In order to inactivate the lactase enxyme, the mixture is heated at 160° F. for 30 minutes. The product is cooled and may be frozen and stored at 0° F., or it may be dried by any convenient method, such as in a roll or spray drier.

The dried product may be used to prepare an ice cream or a process cheese.

*Example 3*

Whey derived from the production of cheddar or cream cheese is treated to remove heat-coagulable protein by adjusting its pH to 4.5 and heating it at a temperature of from 185° to 220° F. until coagulation is complete. The coagulated protein is then separated from the whey by filtration. 0.1% ammonia is added.

The deproteinated whey is cooled to 86° F. and an actively growing S. fragilis yeast starter culture of 10% by weight of the whey is added. The mixture is fermented at 86° F. with aeration at the rate of ⅒ volume of air per volume of liquid for approximately 24 hours, after which the yeast cells are separated from the nutrient medium by centrifuging and washed with warm water.

In order to inactivate the zymase, the yeast cells are quickly frozen by cooling to 0° F. and then dried in vacuo. The dried product passes the Lactase Activity Test and displays no zymase activity. It is easily dispersed or dissolved in a milk product, to hydrolyze the lactose thereof, and because of its bland flavor, light color and good stability it does not impart an unsatisfactory flavor or color to the hydrolyzed milk product.

*Example 4*

Whey derived from the production of casein or cheddar cheese or cream cheese is adjusted to a pH of 4.5 by addition of lactic acid. The whey is then heated at 185° F. for 30 minutes, after which 0.4% diammonium phosphate is added, also at 185° F. and the coagulated protein is separated by filtration. The solids content of the whey is adjusted to 2 to 8%.

To the deproteinated whey is added 0.2% by weight of the whey of Torulopsis spherica yeast cells and the mixture is held for 30 hours at 86° F. without aeration. The yeast cells are separated from the whey, washed in warm water and then placed in an atmospheric tray drier whose temperature is not over 150° F., but high enough and with sufficient air circulation to dry the yeast completely in less than 4 hours. The dry yeast powder is cooled to air temperature as quickly as possible after leaving the drier and should be stored at 40° F.

This product passes the Lactase Activity Test, has a good color and can be used as an additive to milk products in order to hydrolyze the lactose thereof to glucose and galactose in the production of animal feeds.

In contrast, when the yeast is dried above 150° F., or for over 4 hours, although the product passes the Lactase Activity Test, it has a dark color and displays 20% less lactase potency than the freeze-dried product. Moreover, this product imparts a very objectionable flavor to the milk product. If the yeast is dried on a roll drier, the lactase enzyme appears to be completely inactivated, and the product does not pass the Lactase Activity Test.

*Example 5*

Whey derived from the production of cheddar or cream cheese is adjusted to 8% solids content and inoculated with lactic acid-producing bacteria, after which it is incubated until the pH has reached 4.5. It is then heated at 185° F. for 30 minutes in order to coagulate the protein. After separation of the protein 0.2% urea is added, and then the whey is pasteurized by heating at 145° F. for 45 minutes. The pH is then adjusted to approximately 7.0 and 0.1% by weight of the whey of S. fragilis yeast cells are added.

The mixture is allowed to ferment for 10 hours at a temperature of approximately 86° F. with aeration at a rate of 0.5 volume of air per volume of whey per minute.

The yeast is separated from the whey, washed with warm water, and dispersed in water to form a slurry of 10% solids content. The slurry is dried in a spray drier with an inlet air stream at a temperature of 250° F. and an outlet air stream at a temperature of 170° F. The dried powder is cooled to room temperature as quickly as possible and then stored at 50° F. The dry yeast passes the Lactase Activity Test, has a good color and a bland flavor and may be stored at 40° F. for long periods without further loss of activity.

In contrast, yeast spray-dried at an air inlet temperature of over 310° F. and an air outlet temperature of 205° F. suffers a 40% loss of enzyme activity and yeast spray-dried at an air inlet temperature of 340° F. and at an air outlet temperature of 220° F. suffers a 65% loss of enzyme activity. Neither of these products passes the Lactase Activity Test. On the other hand, if the inlet air temperature is 200° F. and the outlet air temperature is 130° F., a dry enough product is not obtained.

*Example 6*

Cheddar or cream cheese whey is adjusted to a pH of about 4.5. The whey is then clarified by heating at 185° F. until protein coagulation is complete, after which the clear supernatant whey is separated by decantation. The whey is adjusted to 2% solids content by the addition of water at a temperature which will bring the mixture to 145° F., 0.2% urea is added, and the whey is held at 145° F. thereafter for 30 minutes to pasteurize it, and then cooled to 86° F. To the whey-base nutrient medium is then added about 0.7% by weight of S. fragilis yeast cells. Propagation is then continued at 86° F. with agitation and with aeration at a rate of 0.5 volume of air per volume of whey per minute, for 10 to 18 hours.

After concentration of the yeast has reached 1.4%, harvesting of yeast is begun. Yeast cells separated from the mixture are washed in warm water and a wet cake formed which is stored at 40° F. until used. When ready to proceed with the hydrolyzing operation, the yeast cells are plasmolyzed with chloroform, toluene, or ethyl ether to kill the zymase. These solvents do not appreciably affect lactase activity, as measured by the Lactase Activity Test.

*Example 7*

The continuous fermenter employed in this example is designed to allow for a constant input of nutrient medium and simultaneous draw off of fermented liquors. The fermenter may be equipped for ample aeration and agitation with a centrifugal pump impeller revolving below a central draft tube extending upwardly from the bottom to two-thirds the height of the fermenter. Air may be injected at the bottom of the vat and the impeller distributes the air in small bubbles throughout the medium contained in the vat. When using such a fermenter, any foam produced is sucked down the central draft tube and redispersed, thus preventing the tank from foaming over.

Fermented liquor passes continuously through an overflow pipe into a surge tank where it is stored ready for further processing. From time to time the material in the surge tank is centrifuged to harvest active lactase-containing yeast therefrom.

For a daily run, the pH of a 100 lb. batch of chaddar cheese whey is adjusted by addition of lime and 0.1% calcium chloride to 6.8. The whey is heated by steam injection to a temperature from 185 to 200° F. and allowed to stand at this temperature from one to two hours. Heat-coagulable protein will precipitate and separate to form an upper layer of clear deproteinated whey, approximating 75 to 80% of the mass. This upper layer is decanted and pumped to the fermenter.

Any additional nutrient materials are added while the decanted deproteinated whey is still at about 200° F., in order to take advantage of the bactericidal characteristics of this high temperature. To the approximately 96 lbs. of clarified whey, taking into account dilution from steam injection, obtained from the original batch of 100 lbs., there is added 0.64 lb. of diammonium phosphate to produce a nutrient medium containing 0.4% diammonium phosphate by weight. This mixture is diluted with 64 lbs. of cold water or of centrifugate of a previous run to produce the nutrient feed medium. The medium is now at a temperature of approximately 140° F., and this temperature is maintained during storage to avoid bacterial spoilage.

To start the fermeter, approximately 1.6 gallons of the nutrient feed medium is brought to 86° F. and placed in the fermentation vat. Temperature controls are adjusted to maintain this temperature, aeration is begun at a rate of 0.13 ft.$^3$/min., and the impeller is started up. A slurry of approximately 0.18 lb. of S. fragilis yeast cells in water is added.

The progress of the fermentation is followed by analysis of samples of the nutrient medium for lactose content. The fermenter is operated until the lactose content has been reduced to 0.1 or 0.2%; this requires from two to six hours. At this time the yeast cell count will be over 1 billion cells per ml. From now on the fermenter may be operated continuously.

Nutrient feed medium at 86° F. is led into the fermenter continuously from the feed tank at a rate of 0.0133 gal./min. and aeration is continued at a rate of 0.13 ft.$^3$/min. After about two hours the fermenter will be full and fermentation liquor will run out the overflow pipe into the surge tank. From time to time the yeast cells are harvested by centrifuging the material collected in the surge tank, and the centrifugate therefrom may be stored and later fortified with nutrients and fed back into the nutrient feed medium. The fermentation may be continued for days at a time without interruption, provided that the pH is maintained at from 4.5 to 5.5 by addition of either ammonia water or lactic acid.

Under these conditions 19.2 gallons of dilute whey can be processed daily, producing 4.8 lbs. of wet yeast cake, which is reduceable by spray-drying, as set forth in Example 1, to 1.2 lbs. per day of a dried active lactase preparation which passes the Lactase Activity Test.

As illustrated in Example 2, the lactase-active zymase-inactive enzyme preparation of the invention may be utilized to hydrolyze the lactose contained in a milk product in order to produce a substantially lactose-free product whose total carbohydrate content is undiminished compared to the natural product, and which has suffered no deterioration in fiavor or appearance by the treatment. Thus the preparation may be used for the preparation of ice cream concentrates derived from skim milk solids which do not contain lactose and which therefore do not develop "sandiness." It may also be used to prepare animal feeds which contain a large amount of milk solids but are free from the cathartic effect of lactose.

The preparation may be in powder form, as is obtainable by drying the yeast, or in cake form, as is obtainable by filtering or centrifuging it and compressing it into cakes (in which form the yeast should be plasmolyzed as herein described before use), or in liquid form, as is obtainable by plasmolyzing the yeast in an organic solvent, or by heating the yeast to an elevated temperature to inactivate the zymase.

Various modifications and changes may be made in the conditions under which the process of the invention is carried out, as will be apparent to those skilled in the art, and it will be understood that the invention is not to be limited, except as set forth in the following claims.

All parts and percentages in the specification and claims are by weight, unless otherwise indicated. Percentages of components of the nutrient medium or of the whey are by weight of the nutrient medium, or of the whey, respectively.

We claim:

1. A process of producing a lactase-active yeast enzyme preparation which comprises propagating yeast of a lactase-producing strain under growth-favoring conditions at a temperature within the range from 80 to 100° F. in a nutrient medium comprising a deproteinated whey in which lactose is the chief source of carbohydrate and having a pH within the range from 3.5 to 7.5, harvesting yeast from the medium and then drying the harvested yeast to obtain a lactase-active yeast enzyme product.

2. A process in accordance with claim 1 which comprises propagating the yeast with aeration at a rate of 0.009 to 1.0 volume of air per volume of medium per minute.

3. A process in accordance with claim 1 in which the deproteinated whey is cheddar cheese whey.

4. A process in accordance with claim 1 in which the deproteinated whey is cream cheese whey.

5. A process in accordance with claim 1 in which the deproteinated whey is casein whey.

6. A process in accordance with claim 1 in which the deproteinated whey is mother liquor wash water.

7. A process in accordance with claim 1 which includes spray-drying the yeast at a temperature below that at which lactase activity is destroyed.

8. A process in accordance with claim 1 in which the yeast is of the species *Saccharomyces fragilis*.

9. A process in accordance with claim 1 in which the yeast is of the species *Torulopsis spherica*.

10. A process of producing a lactase-active zymase-inactive yeast enzyme preparation which comprises propagating yeast of a lactase-producing strain under growth favoring conditions at a temperature within the range from 80 to 100° F. in a nutrient medium comprising a deproteinated whey in which lactose is the chief source of carbohydrate and having a pH within the range from 3.5 to 7.5, harvesting yeast from the medium, dispersing the harvested yeast in water to form a slurry of from 10 to 18% yeast solids and spray-drying the slurry at an inlet air temperature within the range from 200 to 310° F. and an outlet air temperature within the range from 130 to 205° F. to obtain a lactase-active zymase-inactive yeast enzyme product.

11. A process of producing a lactase-active zymase-inactive yeast enzyme preparation which comprises propagating yeast of a lactase-producing strain under growth-favoring conditions at a temperature within the range from 80 to 100° F. in a nutrient medium comprising a deproteinated whey in which lactose is the chief source of carbohydrate and having a pH within the range from 3.5 to 7.5, harvesting yeast from the medium and freeze-drying the harvested yeast in vacuo at a temperature within the range from 0 to 30° F. to obtain a lactase-active zymase-inactive yeast enzyme product.

12. A process of producing a lactase-active zymase-inactive yeast enzyme preparation which comprises propagating yeast of a lactase-producing strain under growth-favoring conditions at a temperature within the range from 80 to 100° F. in a nutrient medium comprising a deproteinated whey in which the lactose is the chief source of carbohydrate and having a pH within the range from 3.5 to 7.5, harvesting yeast from the medium, and tray-drying the yeast at a temperature not in excess of 150° F. to obtain a lactase-active zymase-inactive yeast enzyme product.

13. A process of producing a lactase-active zymase-inactive yeast enzyme preparation which comprises propagating yeast of a lactase-producing strain under growth-favoring conditions at a temperature within the range from 80 to 100° F. in a nutrient medium comprising a deproteinated whey in which the lactose is the chief source of carbohydrate and having a pH within the range from 3.5 to 7.5, harvesting yeast from the medium and plasmolyzing the harvested yeast with an organic solvent to obtain a lactase-active zymase-inactive yeast enzyme product.

14. A process of preparing a lactase-active enzyme preparation which comprises adjusting the pH of whey to within the range from 4.5 to 7, heating the whey at a temperature within the range from 185 to about 220° F. at which protein contained therein coagulates, separating the coagulated protein, adjusting the solids content of the deproteinated whey to within the range from 2 to 8%, adjusting the pH of the whey to within the range from 3.5 to 7.5, if necessary, adding thereto seed yeast of a lactase-producing strain to be propagated therein, propagating the yeast under growth-favoring conditions at a temperature within the range from 80 to 100° F., harvesting yeast from the medium and then drying the harvested yeast to obtain a lactase-active yeast enzyme product.

References Cited in the file of this patent

UNITED STATES PATENTS

| | | |
|---|---|---|
| 997,873 | Wallerstein | July 11, 1911 |
| 1,386,359 | Penniman | Aug. 2, 1921 |
| 1,420,558 | Klein | June 20, 1922 |
| 1,893,152 | Schultz | Jan. 2, 1933 |
| 1,919,675 | Wallerstein | July 25, 1933 |
| 2,031,668 | Reich | Feb. 25, 1936 |
| 2,116,482 | Van Friedrich | May 3, 1938 |
| 2,183,141 | Kauffmann et al. | Dec. 12, 1939 |
| 2,361,315 | Neubers | Oct. 24, 1944 |
| 2,465,870 | Hanson | Mar. 29, 1949 |

FOREIGN PATENTS

| | | |
|---|---|---|
| 474,822 | Great Britain | Of 1936 |

OTHER REFERENCES

Dienert: Comptes Rendus, 129 (1899), pages 63–64.